Sept. 24, 1968 J. BOS ETAL 3,402,463
METHOD OF MANUFACTURING POLE-PIECE UNITS FOR MAGNETIC HEADS
Filed Jan. 14, 1966

INVENTORS
JULES BOS
JACOBUS P. BEUN
JACOB KOORNEEF
GEORGE L. WALTHER
BY

AGENT

United States Patent Office 3,402,463
Patented Sept. 24, 1968

3,402,463
METHOD OF MANUFACTURING POLE-PIECE UNITS FOR MAGNETIC HEADS
Jules Bos, Jacobus Pieter Beun, Jacob Koorneef, and George Ludwig Walther, Emmasingel, Eindhoven, Netherlands, assignors to North American Philips Company, Inc., New York, N.Y., a corporation of Delaware
Filed Jan. 14, 1966, Ser. No. 520,789
Claims priority, application Netherlands, Jan. 14, 1965, 6500402
5 Claims. (Cl. 29—603)

ABSTRACT OF THE DISCLOSURE

A method of manufacturing a pole piece for a multiple magnetic head including the steps of forming mating surfaces between two blocks of ferromagnetic material, forming a profile within each of the mating surfaces, placing the blocks together along the mating surfaces, forming a plurality of grooves at right angles to the mating surfaces, partially filling the grooves with non-magnetic material, bonding the mating surfaces and groove material together with a glass or enamel material, and removing material from the top of the assembled blocks with the upper portion of the profiled edge as a reference surface until the desired gap height is reached.

---

This invention relates to methods of manufacturing a pole-piece unit for a magnetic head intended for recording, reproducing and/or erasing magnetic recordings, and more particularly for a multiple magnetic head for parallel tracks. The pole-piece unit comprises a stack of at least three plates of packets made of sintered oxidic ferromagnetic material alternating with non-magnetic material in the direction of stacking and is provided with a smooth surface (running surface) which is parallel to the direction of stacking and which includes the useful gap or gaps. The unit is cut through along one or more planes at right angles to the said surface by one or more thin glass or enamel layers which adhere together the parts on either side of said layer and which in the sintered oxidic ferromagnetic plates constitute the useful gap or gaps for the head.

Such pole-piece units in which unmagnetizable plates are adhered to plates of sintered oxidic ferromagnetic material with the aid of, for example, solder or an epoxy resin are known. In the manufacture of such heads two separate heating processes are required: one process for melting the solder or the epoxy resin and subsequently adhering the plates together while cooling, another process for melting the gap-filling material in order to form the useful gaps.

Since, according to modern techniques, substantially glass or enamel is used as the gap-filling material (melting point approximately 800° C.) because of favorable mechanical properties in combination with the sintered oxidic ferromagnetic material used, and the melting points of solder, resin or the like are much lower than that of the said gap-filling material, many difficulties arise in the manufacture.

The method previously referred to cannot be used in this case since during heating to a temperature at which the glass or enamel melts, the solder or resin will also melt or even be burnt so that the prefabricated core parts no longer satisfy the requirements imposed or even completely fall to pieces.

To obviate these difficulties, with the said combination of adhering means the gaps will first be formed by providing each of two pieces of sintered oxidic ferromagnetic material with a smooth surface and then pressing these surfaces with the interposition of glass or enamel against each other while heating to the melting temperature of the glass or enamel. Subsequently the resulting assembly is provided with grooves at right angles to the gap-bounding surfaces in which grooves unmagnetisable spacers are placed and then glued in position using solder, resin or the like.

However, this method in turn has the disadvantage that, due to the difference between the coefficients of expansion of the solder or resin and the unmagnetisable material and the sintered oxidic ferromagnetic material, mechanical stresses may arise in the running surface of the magnetic head ultimately to be manufactured. These stresses are liable to cause warping of the plates so that the running surface of the head becomes uneven, or even to breakage of the plates. Also, although the melting temperatures of the solder and the resin are much lower than those of the glass or enamel, the glass in the gap will still soften slightly during the heating of the solder or resin, so that the accurately determined length of the useful gap is liable to change.

Not only the manufacture of a pole-piece unit of the above-mentioned kind causes great difficulty, but such a unit is also found to be not particularly satisfactory in use. Such a unit has a smooth record carrier running surface in which the gap or gaps filled with glass or enamel are present, while also the surfaces of adhesion between the plates of sintered oxidic ferromagnetic material and the unmagnetisable plates end into it. During use, a certain friction between the running surface and the record carrier occurs, resulting in wear of the running surface. The sintered oxidic ferromagnetic material and the glass or enamel serving as the gap-filling material have approximately the same properties as to wear. However, solder, resin or the like have a much lower resistivity to wear so that unevennesses in the form of grooves may soon occur in the running surface at the areas of attachment and where the tape contacts the head. The edges of such grooves crumble off very easily so that crystals may find their way between the record carrier and the running surface, causing unevenness of the running surface. If such a situation has arisen the pole-piece unit cannot be used further.

The present invention solves the structural difficulties in manufacturing a pole-piece unit of the kind preferred, and provides the possibility of manufacturing a unit which suits its purpose better. To this end, the method according to the invention is characterized in that use is made of at least two blocks of sintered oxidic ferromagnetic material each of which is provided with at least one accurately processed surface. The surfaces fit against one another in pairs, and at least one of each two surfaces is profiled. The blocks are clamped together along these surfaces with the interposition of a spacer and, if desired, a foil of glass or enamel, with the spacer being at a distance at least equal to the desired depth of the gap from the edge of the profile located on the side of the future running surface. Grooves are formed in the blocks, preferably at right angles to the said surfaces and on the side where the spacer is present, which grooves intersect the profile and are filled with a body unmagnetisable at least in a direction at right angles to the grooves up to a distance at least larger than the depth of the gap above the edge of the profile. The glass or enamel is placed both in the grooves and in or near the gap and the assembly is heated to a temperature at which the glass or enamel melts and, subsequently, the length of the gap is adjusted to the correct value, the edge of the profile serving as a reference line for accurately obtaining the desired depth of the gap. Thereafter, the part containing the gaps is separated from the remaining part of the packet along a plane at right angles to the gap-bounding surfaces and intersecting or contacting the unmagnetisable bodies by a mechanical treatment.

The method according to the invention affords the important advantage that, since the spacers which are unmagetisable in a direction at right angles to the grooves, are not arranged between the tracks as loose plates or possibly as packets throughout the height of the unit in each individual core part, but rather come to bear in the grooves provided therefor and extend throughout the length of the pole-piece unit, it has become possible in one heating process to adhere together the core parts by means of the glass or enamel in the gap as well as to secure the spacers in the grooves between the tracks by means of the glass or enamel provided on the spacers in the form of a rod or in the pulverulent state. In fact, if the spacers occur in each individual core part and extend throughout the height of the unit, the positions of the spacers relative to the plates of sintered oxidic ferromagnetic material would have to remain substantially unchanged during the heating process for forming the gap, since otherwise the accurate smoothness and flatness of the gap-bounding surfaces is disturbed and the pole-piece unit to be manufactured may become useless. Apart from the difference between the melting temperatures of the adhering means, one heating process for adhering together both the spacers and the two core parts is impossible by the known method of construction as long as the spacers form parts of the gap-bounding surfaces.

The grooves must intersect the profile of the relevant core part so that the spacers extend beneath the gap to be formed in order to ensure sufficient rigidity of the pole-piece unit.

It is necessary that the accurately-processed surface of one block be profiled in order to establish a reference line for grinding off the upper surface to the required depth of the gap.

In one embodiment of the method the part including the gaps is separated from the remaining part of the assembly along a plane at right angles to the gap-bounding surfaces and completely located in the sintered oxidic ferromagnetic material, whereafter in this plane the whole length of the unit is provided with grooves which are aligned with the filled grooves in the running surface and extend into these grooves.

Such an embodiment is advantageous if the closing piece used for the magnetic cores is a flat plate which may be arranged in a simpler manner than a closing piece which is made U-shaped for each individual core. The projecting limbs of the pole-piece unit are then used for accommodating the required turns of wire.

In many cases it will be necessary for the record carrier to be supported additionally at its edges. In this case the support for the record carrier to the right of the rightmost track and to the left of the leftmost track is preferably constituted by a piece of unmagnetisable material located in the running surface. To this end, a further embodiment of the method according to the invention is characterized in that the plates of sintered oxidic ferromagnetic material which constitute the front and rear sides of the pole-piece unit are removed, for example, by grinding off.

It is common practice to clamp the glass or enamel which serves as the gap-filling material and which also adheres the core parts together in the form of a foil between the two future gap-bounding surfaces. It is also possible to clamp a spacer between the two surfaces, having a thickness equal to the length of gap ultimately desired, the gap-filling material being provided in some form or other near the gap so that this material, when heated to its melting temperature, is drawn into the gap due to the capillary action thereof. Such a method has previously been suggested.

The present invention offers a handy method of providing the gap-filling material near the gap and, to this end, one embodiment of the method according to the invention is characterized in that a recess which is filled with glass or enamel is formed in one of the two accurately-processed surfaces, before being clamped together, above each gap to be formed, at a distance from the edge of the profile which is larger than the desired depth of the gap and on the side where a spacer is placed.

Especially in the manufacture of multitrack magnetic heads it is difficult to place the filling material so that, due to the capillary action, the whole of the gap is filled homogenously indeed without, for example, gas bubbles being enclosed. It is very important that the filling material has a favourable location relative to the gap during the heating process. The recess may be, for example, a central cavity in the surface which is filled with the powdered glass or enamel.

In another embodiment of the method according to the invention, in order to be able to provide the filling material for the whole of the pole-piece unit in one operation instead of for each individual gap (for each individual track) the recess is formed as a small gutter throughout the surface in parallel with the edge of the profile, before the grooves are formed, a rod of glass or enamel being placed in this small gutter after the bodies unmagnetisable in the direction at right angles to the grooves have been placed in the grooves.

The invention also relates to a pole-piece unit manufactured by one or more of the above-mentioned methods.

In order that the invention may be readily carried into effect, one embodiment thereof will now be described in detail, by way of example, with reference to the accompanying diagrammatic drawing, in which.

Figure 1:
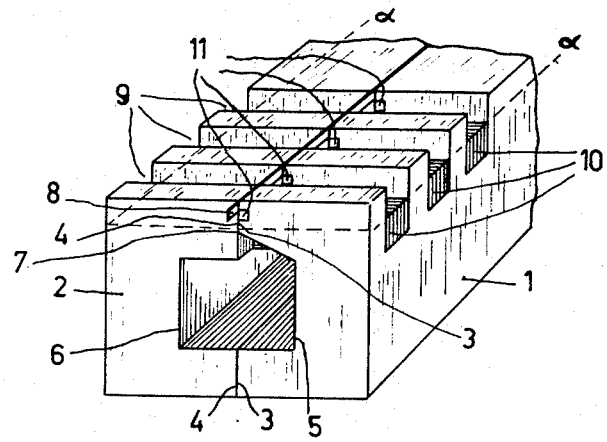
FIGURE 1 is an isometric side view of a multiple magnetic head at a manufacturing stage preceding the provision of glass or enamel near the gaps and near the unmagnetisable bodies and the subsequent heating process.

FIGURE 1 shows blocks 1 and 2 of sintered oxidic ferromagnetic material having accurately-processed surfaces 3 and 4, which constitute the gap-bounding surfaces in the completed head. The two surfaces have profiles 5 and 6 respectively, an edge 7 of the profile 5 constituting the reference line for determining the desired depth of the gap. The spacing between the surfaces 3 and 4, i.e. the length of the gap, is determined by the thickness of a spacer 8.

The blocks 1 and 2 are formed with grooves 9 of a depth such as to intersect the profile 5. Each groove 9 is filled with material 10 to such an extent that this material forms part of the running surface in the completed pole-piece unit, that is to say that it projects at least above the plane which extends at a height equal to the depth of gap above the edge 7 of the profile 5 and which ultimately will form the running surface. The material 10 thus extends into or above the plane of sawing α which lies above the running surface to be ultimately formed.

The glass or enamel which adheres together the two blocks of sintered oxidic ferromagnetic material and which also fills the gaps may be provided as a foil between the surfaces 3 and 4 and under the spacer 8. It is also possible to form one of the surfaces 3 and 4, above each gap to be formed, with a recess in which glass or enamel in a pulverulent state may be provided before the two blocks 1 and 2 are clamped together.

In the embodiment shown the gap-filling material is provided in a third manner, namely by placing a small rod of glass or enamel in a small gutter 11 formed in the surface 3 above the gap to be formed. This small gutter 11 is formed before the block 1 is provided with the grooves 9. The small gutters above the gaps to be formed will thus be aligned so that a rod of glass or enamel may readily be introduced into them after the grooves 9 have been formed and filled with the material 10.

Glass or enamel in the form of a rod or in the pulverulent state is provided on the material 10 with which the grooves 9 are filled.

When, after providing the glass or enamel both near the gap to be formed and on the bodies 10, the assembly is heated to the melting temperature of the glass or enamel, this material will be drawn between the surfaces 3 and 4 due to capillary action and also find its way between the walls of the bodies 10 and the grooves 9. After cooling, the gaps will be filled with glass or enamel so that at the same time the blocks 1 and 2 are adhered together and the bodies 10 are cemented in the grooves 9.

Figure 2:
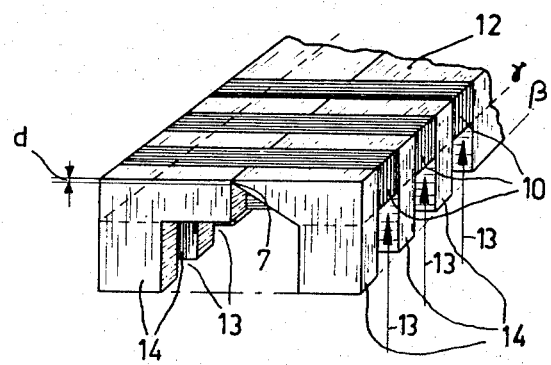
FIGURE 2 shows a pole-piece unit which is completely finished.

FIGURE 2, in which corresponding parts are indicated by the same reference numerals as in FIGURE 1, shows the completed pole-piece unit which is obtained from the structure of FIGURE 1 after the running surface 12 has been formed by grinding off to the desired distance $d$ (depth of gap) from the reference line 7 and after the upper part of the construction has been separated from the lower part along the plane $\beta$. The plane $\beta$ lies completely in the sintered oxidic ferromagnetic material, that is to say lies completely beneath the bodies 10, and is provided with grooves 13 which are aligned with the grooves 9 and hence with the bodies 10. Resulting limbs 14 may serve to receive the turns of wire required for the magnetic head to be ultimately formed.

It is also possible to divide the construction of FIGURE 1 into two parts along the plane $\gamma$ instead of along the plane $\beta$. In this case the plane $\gamma$ does not extend wholly through the sintered oxidic ferromagnetic material but contacts or intersects the bodies 10. This results in a flat pole-piece unit in which the closing piece used for each individual core is a U-shaped core part which may include the turns of wire required for the head. (These core parts may be combined, if desired, to form a unit with the use of unmagnetisable material.)

The methods above described may also be advantageous for the manufacture of a pole-piece unit of a monotrack magnetic head, especially in cases where the record carrier needs a support of unmagnetizable material on either side of the magnetic core parts.

What is claimed is:

1. A method of manufacturing a pole piece for multi-track magnetic head with a desired gap height from at least two blocks of sintered oxidic ferromagnetic material, each of which is provided with at least one accurately-processed gap forming mating surface and one smooth running surface at right angles to said mating surface, at least one of said blocks containing a profiled segment within said mating surface to accommodate windings, said profiled segment having an upper edge intersecting the mating surface at a distance below the running surface which exceeds the ultimately desired gap height, comprising the steps of: assembling together the respective mating surfaces of each of said blocks to form said gap with the interposition of a spacer between said mating surfacees, said spacer occupying a depth from said running surface into said mating surfaces sufficient to provide the desired gap height in the remaining gapped portion of said mating surfaces, forming a plurality of grooves in the running surface of said blocks at right angles to said mating surfaces, said grooves extending across and penetrating through said running surfaces to a depth along said mating surfaces sufficient to intersect the profiled segment of said block assembly, filling said grooves with a pole piece separation material unmagnetizable at least in a direction at right angles to the grooves, said pole piece separation material filling said grooves to a depth at least as large as the height of the ultimately desired gap above the profiled segment, placing a quantity of fusible non-magnetic material in proximity with said gap and said grooves, heating said block assembly to a temperature sufficient to allow said quantity of fusible non-magnetic material to soften and flow into said gap and into the grooves, cooling said assembly to allow said fusible non-magnetic material to solidify and thereby to cause adherence between respective mating surfaces and between said groves and said pole piece separation material, removing material including said spacer from said running surfaces to form the desired gap height by using the upper edge of the profiled segment as a reference point, and removing further material from said block assembly to form limbs for each respective pole-piece unit to accommodate windings.

2. A method as claimed in claim 1, wherein said assembly block portion including the gaps is separated from the remaining part of the assembly along a plane at right angles to the gap-bounding mating surfaces, said plane being completely located in the sintered oxidic ferromagnetic material, whereafter the whole length of the unit is provided with grooves which are aligned with the filled grooves in the running surface and extend into these grooves, thereby forming said limbs.

3. A method as claimed in claim 1 wherein the plates of sintered oxidic ferromagnetic material which constitute the front and rear sides of the pole-piece unit are removed by grinding.

4. A method as claimed in claim 1 wherein a recess is formed in one of the two accurately-processed surfaces and filled with said fusible non-magnetic material before said blocks are clamped together, said recess being above each gap to be formed and located at a distance from the edge of the profile which is larger than the desired depth of the gap and between that portion of the mating surfaces where the spacer is placed.

5. A method as claimed in claim 4, wherein said recess is formed as a small gutter extending throughout the surface in parallel with the edge of the profile and formed before the grooves are formed, a small rod of glass or enamel being introduced into the said small gutter after said non-magnetic material has been placed in the grooves.

References Cited

UNITED STATES PATENTS

| | | | |
|---|---|---|---|
| 3,145,452 | 8/1964 | Camras | 29—603 |
| 3,187,410 | 6/1965 | Duinker et al. | 29—603 |
| 3,187,411 | 6/1965 | Duinker et al. | 29—603 |
| 3,224,073 | 12/1965 | Peloschek | 29—603 |
| 3,249,700 | 5/1966 | Duinker et al. | 179—100.2 |
| 3,249,987 | 5/1966 | Duinker | 29—603 |
| 3,302,268 | 2/1967 | Duinker | 29—603 |
| 3,353,261 | 11/1967 | Bradford et al. | 29—603 |
| 3,354,540 | 11/1967 | Duinker | 29—603 |

JOHN F. CAMPBELL, *Primary Examiner.*

D. C. REILEY, *Assistant Examiner.*